May 4, 1954  T. O. SUMMERS, JR  2,677,514
GYRO PILOT

Filed June 28, 1950  5 Sheets-Sheet 1

INVENTOR.
THOMAS O. SUMMERS, JR.
BY
R. E. Geauque
ATTORNEY

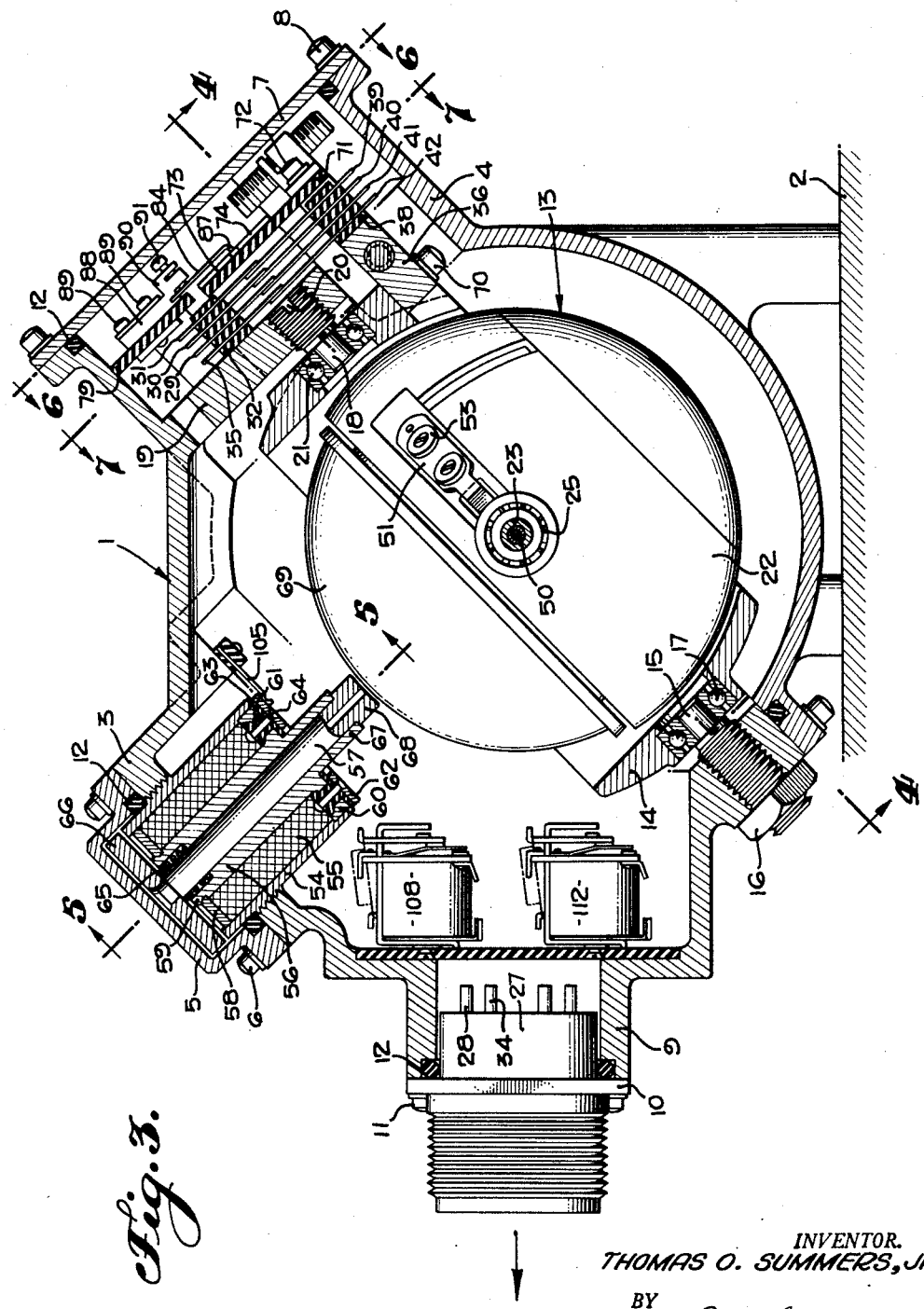

May 4, 1954 T. O. SUMMERS, JR 2,677,514
GYRO PILOT
Filed June 28, 1950 5 Sheets-Sheet 3
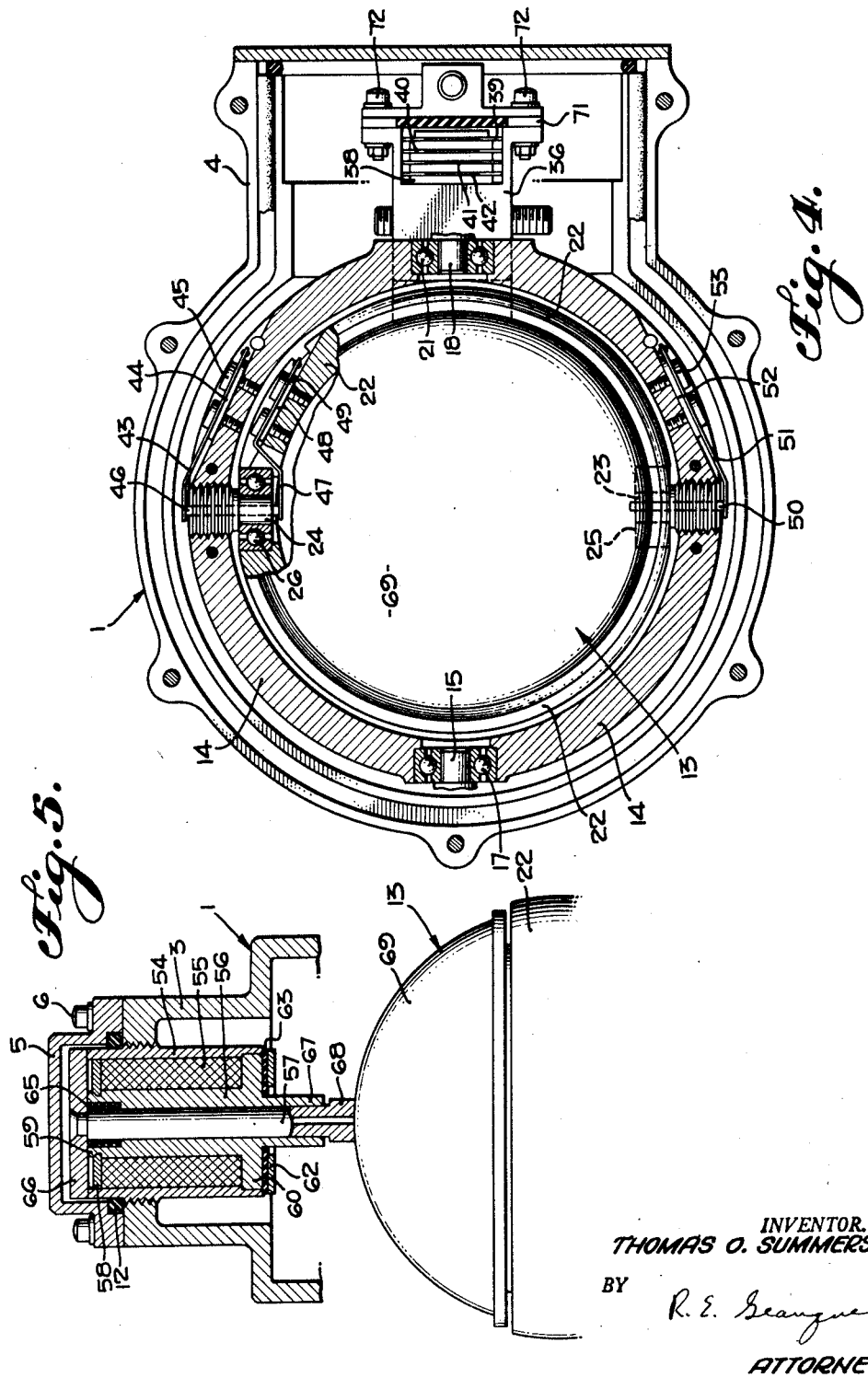
INVENTOR.
THOMAS O. SUMMERS, JR.
BY
R. E. Geaugue
ATTORNEY May 4, 1954  T. O. SUMMERS, JR  2,677,514
GYRO PILOT Filed June 28, 1950  5 Sheets-Sheet 4

INVENTOR.
THOMAS O. SUMMERS, JR.
BY
P. E. Geaugue
ATTORNEY

May 4, 1954 T. O. SUMMERS, JR 2,677,514
GYRO PILOT

Filed June 28, 1950 5 Sheets-Sheet 5

INVENTOR.
THOMAS O. SUMMERS, JR.
BY R E Geangue
ATTORNEY

Patented May 4, 1954

2,677,514

UNITED STATES PATENT OFFICE 2,677,514

GYRO PILOT

Thomas O. Summers, Jr., Sherman Oaks, Calif.

Application June 28, 1950, Serial No. 170,720

14 Claims. (Cl. 244—79)

This invention relates to a novel gyro pilot, and more particularly, to an instrument which is capable of accurately controlling the rate of turn of an aircraft while in flight. In order to obtain the desired results, a gyro having an inner and outer gimbal is mounted so that its spin axis normally lies in the vertical fore and aft plane of symmetry of the aircraft, with its spin axis tilted forward from the vertical axis of the aircraft. This tilting of the gyro provides a means of sensing either yaw or roll of the aircraft in a given direction. A novel means of precessing and simultaneously case erecting the gyro is provided, whereby the gyro will be precessed at a constant rate so as to control the rate of turn of the aircraft. The precessing means can also be used to cage the gyro before flight or under normal flight conditions, and therefore provide a single efficient means for both caging the gyro and precessing the gyro to change the course of the aircraft.

Previous gyro pilots have utilized a reversible torque motor about one gimbal axis of the gyro for precessing the gyro in order to control the rate of turn of the aircraft either to the right or left. When such a torque motor is used, an additional torque motor is required about the other gimbal axis of the gyro so that the gyro can be case erected. It is quite obvious that the use of a torque motor about the inner gimbal axis has the disadvantage that electrical power must be supplied to the torque motor through the outer gyro gimbal, which results in considerable wiring difficulty. Further, gyros equipped with torque motors are bulky in design and very expensive to manufacture, and these factors become increasingly important when aircraft are designed but for a single flight.

It is therefore an object of this invention to provide in a gyro pilot a novel precessing means which is simple and compact in form and which can be mounted independently of the gyro gimbal supports. It is also an object of the invention to provide a single precessing means which can be utilized to easily and efficiently case erect the gyro while precessing the gyro at a constant rate to control turning of the aircraft.

A further object of this invention is to provide a simple and effective followup system and one by which the rate of turn of an aircraft in either direction will be controlled by the rate of turn of the gyro as determined by the precessing means. It is also an object of this invention that hunting in the follow-up system be held to a minimum to reduce the wandering of the aircraft about the desired turning path.

A still further object of the invention is to provide a novel mounting and positioning arrangement for the gyro, so that the gyro is sensitive to either yawing or rolling of the aircraft in a given direction. Also included with the other objects of the invention is the novel electrical circuit for transmitting electrical signals under control of the gyro to the proper control surfaces of the aircraft.

These and other objects of the invention, not enumerated above, will be clearly set forth in the following description and in the drawings in which Fig. 1 is a side view in elevation of the gyro pilot casing rigidly mounted to the aircraft structure.

Fig. 3 is a vertical section view taken along line 3—3 of Fig. 2, showing the gyro assembly in side elevation.

Fig. 4 is a partial section view taken along line 4—4 of Fig. 3, illustrating portions of the wiring circuit for the gyro motor.

Fig. 5 is a partial sectional view along line 5—5 of Fig. 3, showing the precessor assembly in cross section.

Figure 1:
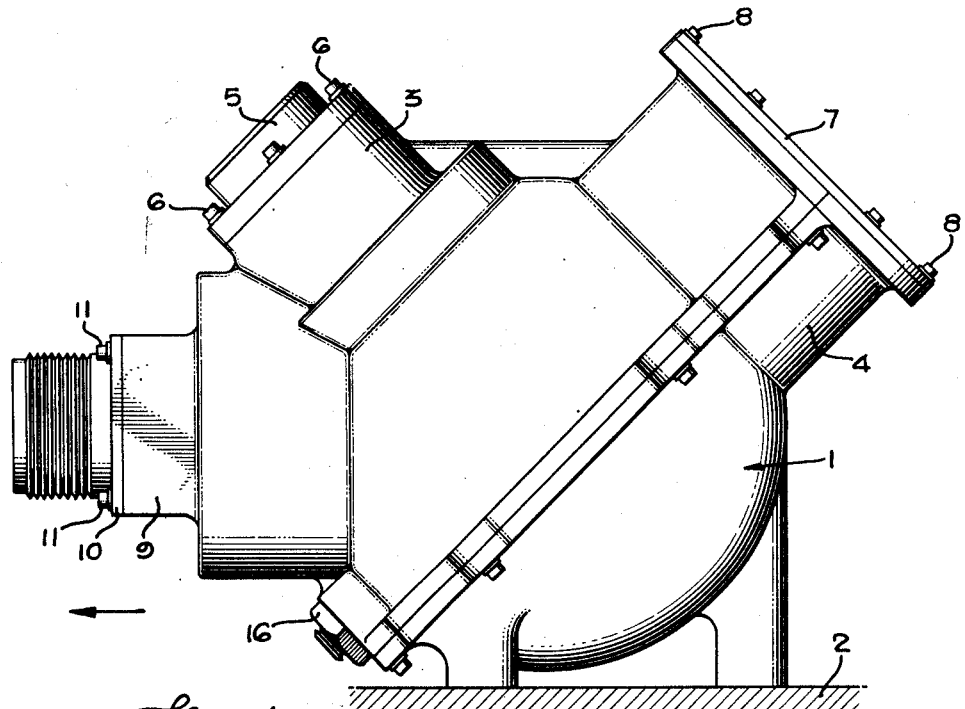
Figure 2:
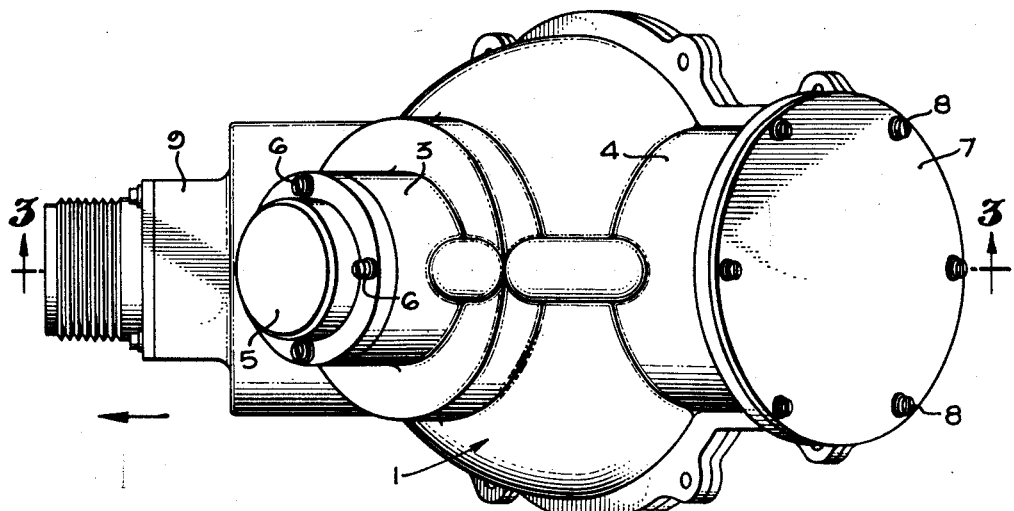
Fig. 2 is a top plan view of the gyro pilot illustrated in Fig. 1.

The embodiment of the present invention, which has been chosen for illustration and description, comprises a divided casing 1 mounted on support 2, which is a rigid part of the aircraft with which the gyro pilot is to be used. Casing extensions 3 and 4 respectively enclose the precessor assembly and pickoff assembly, which will later be described. Cover plate 5 is held to casing extension 3 by means of screws 6, while cover plate 7 is secured to casing extension 4 by screws 8. The casing extension 9 houses the electrical contact box through which power is supplied to the gyro motor and to the pickoff assembly. Cover plate 10 is secured to casing extension 9 by screws 11. A flexible rubber gasket 12 is positioned between casing extensions 3, 4 and 9 and their respective cover plates in order to provide a dustproof seal for the interior of the gyro pilot casing.

Referring to Fig. 3, a gyro having a two gimbal support is shown generally at 13. The outer gimbal ring 14 is pivotally mounted at one end by shaft 15, which is supported by casing 1 and screw threaded to the casing to provide for position adjustment. Nut 16 serves to lock shaft 15 in any selected position. Two bearing races contain ball bearings 17, which rotatively support gimbal ring 14 upon shaft 15. A similar supporting structure is provided for the opposite end of ring 14, wherein shaft 18 is supported by extension 19 of casing 1. Shaft 18 is screw threaded to the extension 19 and contains a slot 20 for adjusting the position of the shaft. Ball bearings 21 with associated races serve to rotatably support gimbal ring 14 upon shaft 18. The inner gimbal ring 22 is supported upon shafts 23 and 24, which are mounted in outer gimbal ring 14, and positioned 90 degrees from the shafts 15 and 18 (see Fig. 4). Ball bearing assemblies 25 and 26 serve to mount inner gimbal ring 22 for rotation in shafts 23 and 24 respectively. The axis of the inner gimbal ring is therefore disposed perpendicular to the axis of the outer gimbal ring. The gyro rotor and motor (not shown) are mounted within inner gimbal ring 22, with the spin axis of the rotor position perpendicular to the axis of the inner gimbal ring.

As previously noted, the spin axis of the gyro 13 is normally positioned in the vertical fore and aft plane of the aircraft with the upper portion of the axis tilted forward 45 degrees. The direction of forward movement of the aircraft along the fore and aft axis is indicated by the arrow in Fig. 3. Due to the inclined position of the gyro, it is sensitive to both yaw and roll of the aircraft. With the gyro in this position, when the aircraft rolls and/or yaws to the left, it moves to the left with respect to the outer gimbal, and when the aircraft rolls and/or yaws to the right, it moves to the right with respect to the outer gimbal. The gyro therefore affords an instrument for accurately sensing the change in direction of the aircraft.

Figure 7:
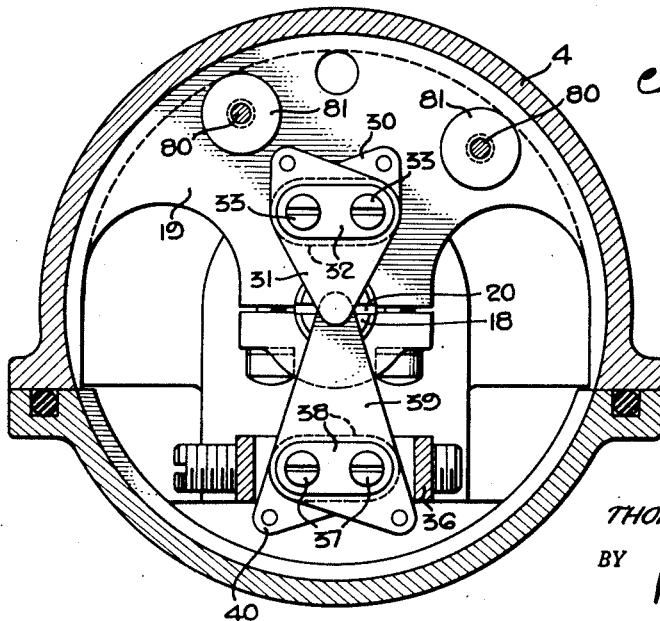
Fig. 7 is a sectional view of the gyro pilot housing along line 7—7 of Fig. 3, showing the electrical contact plates in end elevation.

The connector 27 is provided with eight pins (only four of which are shown) for supplying electrical power and electrical signals to the gyro pilot. Pin 28 is a 24 volt D. C. supply for driving the electrical gyro motor and for energizing the pickoff assembly and the precessor assembly. Connected to pin or terminal 28 are three spaced contact plates 29, 30, 31, mounted on an insulating member 32, which is rigidly held to casing extension 19 by means of screws 33 (see Fig. 7). The pin or terminal 34 of connector 27 leads to ground, and is connected to contact plate 35 mounted upon insulating member 32. The outer gimbal ring 14 of the gyro carries control arm 36 which moves with the ring 14, and attached to arm 36 by screws 37 is an insulating member 38. The member 38 carries four spaced contact plates 39, 40, 41, 42, which make spring contact with plates 29, 30, 31, 35, since all of these plates are of material which can be slightly deformed to secure constant contact. The pairs of contact plates 31, 39 and 30, 40, supply electrical current to the pickoff assembly in a manner presently to be described. The pair of contact plates 29, 41 supply power to the gyro motor in order to rotate the gyro wheel upon its spin axis. It is readily apparent that the contact plates provide a simple means for maintaining an electrical circuit, even though member 32 moves relative to member 38.

Connected to contact plate 41 (wiring not shown) is the arm 43 which rests on insulated plate 44, and which is attached to outer gimbal ring 14 by means of insulated screws 45 (see Fig. 4). The arm 43 bears upon one end of a silver pin 46 which extends through the center of shaft 24. An arm 47 is mounted upon gimbal ring 22 by insulated plate 48 and insulated screws 49. The arm 47 contacts the other end of pin 46 and is also connected to the 24 volt D. C. motor which drives the gyro wheel at constant speed. The ground connection for the gyro motor is connected (by circuit not shown) to a silver pin 50, which extends through the center of shaft 23. Arm 51, mounted by insulated plate 52 and insulated screws 53, connects pin 50 with contact plate 42, which is in turn connected to ground through contact plate 35 and pin 34 in connector 27. By means of the circuit which has been described, it is possible to supply electrical current to the gyro motor even though the motor is supported by the inner gimbal, which has two degrees of freedom relative to the casing 1.

*Precessor assembly*

The precessor assembly contained in casing extension 3 will now be described. An outer sleeve 54 is screw threaded for adjustment to extension 3 and surrounds an electrical solenoid coil 55. An inner cylindrical member 56 is positioned within coil 55, and is provided with an axial opening for receiving the precessor 57. The coil 55 is retained in position at one end by ring 58, which is secured by the peened end 59 to member 56. The opposite end of the coil 55 is retained by ring 60 having a pressed fit with sleeve 54. Ring 60 has a shoulder which provides a reduced bore in which insulated ring 61 is contained. A slip ring 62 is separated by insulated washer 63 from pressed ring 60 and cylindrical member 56. The conducting rivets 64, extending through slip ring 62, insulated washer 63 and insulated ring 61, serve as a means for retaining slip ring 62 in position and provide an electrical circuit between coil 55 and slip ring 62. An enlarged bore in one end of member 56 contains a spring 65, which constantly bears against the armature 66 attached to one end of precessor 57. An extension 67 on the other end of member 56 serves as a stop for the enlarged head 68 of precessor 57 in order to prevent armature 66 from striking cover plate 5 when precessor 57 is moved by the action of spring 65.

The enlarged head 68 of the precessor 57 is composed of a frictional material and has a concave surface for contacting the gyro dome 69. This gyro dome is directly connected to the spin axis of the gyro and rotates with the gyro rotor. The action of the precessor 57 upon the gyro when the precessor head is in contact with dome 69 will now be explained. It is well known that a force applied about one axis of a gyro will cause the gyro to precess about an axis at right angles to the first axis. Assuming that the precessor head 68 contacts dome 69 at some position on the dome which does not lie along the spin axis of the gyro rotor, a tangential frictional force will then be applied to the dome surface, since the dome 69 is rotating. This frictional force will be in a direction which is at right angles to the direction from which the precessor head 68 is displaced from the spin axis and will therefore cause the gyro to precess at right angles to the frictional force direction and toward the precessor head 68. Of course, if the precessor head 68 contacts dome 69 at a position directly along the spin axis, as shown in Fig. 5, no effective force will be developed, and no precession will take place. It therefore becomes apparent that when the precessor is displaced from the spin axis, the gyro will continuously precess until the spin axis is brought directly under the precessor head 68.

Another principal well known concerning gyros is that the rate of precession is proportional to the magnitude of the torque applied to the gyro axes. The magnitude of the torque applied about the gyro axes by precessor head 68 will be the product of the frictional force described above, and the perpendicular distance of this force from a plane common to both gimbal axes. The precessor assembly of this invention is so designed that a very nearly constant frictional force will be developed on the dome 69, while the precessor 57 is in operation, regardless of the position of the precessor head 68 relative to the spin axis. Also, due to the very slight curvature of the dome 69 in the proximity of the spin axis, the precessor head 68 can move some distance away from the spin axis and still remain approximately the same perpendicular distance from the plane common to both the major and minor gimbal axes of the gyro. Since the precessor develops very nearly a constant frictional force on the dome 69 and maintains this force at very nearly a constant distance from the plane of the gimbal axes, it will develop a substantially constant torque about the gyro axes, which will not be appreciably effected by the position of the precessor head 68 on the dome 69, and which will result in a substantially constant rate of precession. If the head 68 is moved from the spin axis in the direction of the major gimbal axis, a torque will be developed about the major axis and cause the gyro to precess at a constant rate about the minor gimbal axis in the direction of displacement of the precessor head. By moving the precessor head in the direction of the minor gimbal axis, a torque will be developed about this axis and cause the gyro to precess about the major gimbal axis at a constant rate, and in the direction of the precessor head. If the head 68 is displaced in any other direction, the frictional force on dome 69 will be resolved and result in torques being applied about both gimbal axes to cause the gyro to precess at the same constant rate toward the head 68.

Due to the action of the precessor 57, it is useful in the gyro pilot of this invention for several purposes. Prior to take-off, the precessor can be used to cage the gyro, and for this purpose it is only necessary to energize solenoid 55 so that precessor head 68 contacts dome 69. The gyro will then precess until the spin axis is in line with the precessor head, as has been previously explained. Also, the precessor can be used to develop a constant rate of precession to maintain a constant rate of turn, as will be presently explained in connection with the description of the pickoff assembly.

Pickoff assembly

Figure 8:
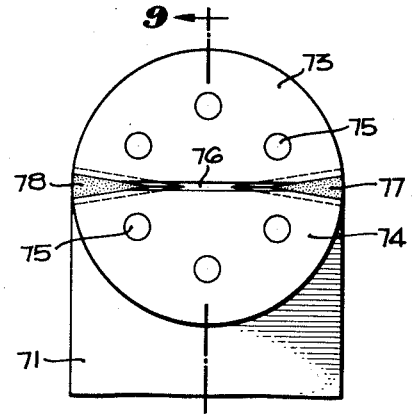
Fig. 8 is an end elevational view of the electrical contact disk which comprises a part of the pickoff assembly.
Figure 9:
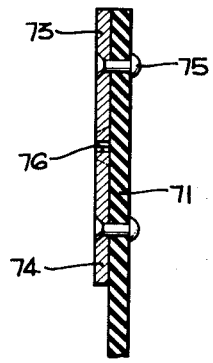
Fig. 9 is a sectional view of the electrical contact disk taken along line 9—9 of Fig. 8.

The control arm 36 is attached to the outer gimbal ring 14 by means of screws 70, and an insulating plate 71 is mounted on the end of arm 36 by screws 72. The plate 71 is perpendicular to the major axis of the gyro. A circular electrical contact disk is positioned on plate 71 so that its center lies along the major axis of the gyro, and the disk is composed of an upper section 73 and a lower section 74, which are attached by rivets 75 to plate 71. The disk sections are separated by the space 76 and by the insulated wedges 77 and 78, so that electrical current cannot flow from one disk to the other. As shown in Figs. 8 and 9, the edges of the disk sections are tapered to receive the tapered edges of the wedges when they are forced between the sections. From the manner in which the circular sections 73, 74 are mounted and positioned, it is obvious that the section will revolve about the center of the contact disk as the gyro precesses about its major axis.

An insulated plate 79 is attached by screws 80 to rods 81 which are rigidly secured to casing extension 19 so that the plate 79 will move with the casing 1. Three electrical contact arms 82, 83, 84 carrying contact points 85, 86, 87 respectively are attached to members 88, which are held to plate 79 by screws 89. Brackets 90 on members 88 are supplied with screws 91 which bear against the contact arms to provide a means of maintaining the pressure of the contact points against the sections of the contact disk. Under normal level flight conditions, contact point 87 rides upon wedge 77, while contact points 85 and 86 are positioned respectively above and below wedge 78 and in contact with disk sections 74 and 73 respectively. However, if the aircraft rolls and/or yaws to the right, contact point 85 will approach wedge 78, and if the aircraft rolls and/or yaws to the left, contact point 86 will approach wedge 78. The use of the contact disk sections, and of the contact points will be presently explained in connection with the description of the control circuit for the gyro pilot.

Control circuit

Figure 10:
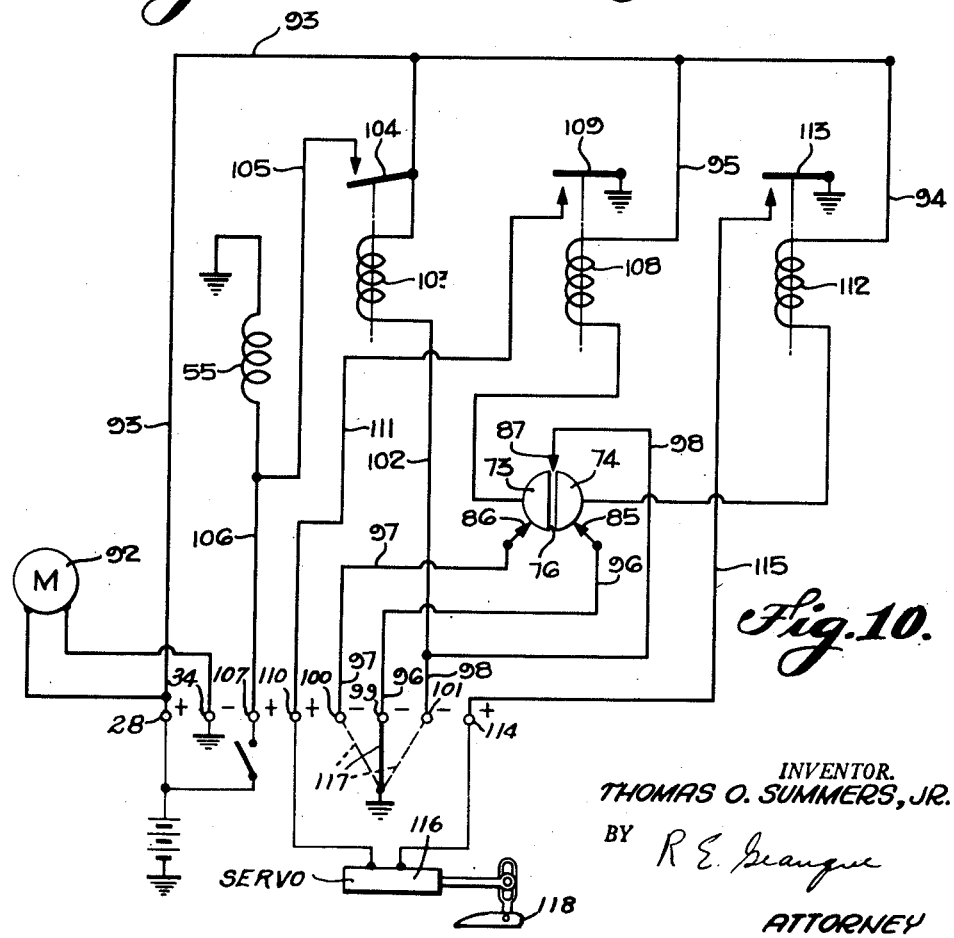
Fig. 10 is a view of the electrical wiring diagram utilized for obtaining and transmitting electrical signals to the aircraft control surfaces.

The control circuit is shown in Fig. 10, and the positive side of the 24 volt D. C. supply is indicated at terminal 28. The electric motor 92 for the gyro is connected to ground at terminal 34. The line 93 constantly supplies a voltage to disk section 74 through line 94, and to disk section 73 through line 95. The lines 96, 97, 98 connect contact points 85, 86, 87 to negative terminals 99, 100, 101 respectively. Also, connected between line 93 and terminal 101 is the line 102 containing the relay 103, which opens normally closed contact arm 104 when it is energized. When contact 104 is closed, it is connected to line 93, and electrical current will flow through line 105 and solenoid coil 55 to ground, and thereby cause the precessor head 68 to contact the dome 69. Line 106 is connected to positive terminal 107 so that current will not flow from line 105 to line 106.

The line 95 supplying voltage to disk section 73 contains a relay 108 for controlling contact arm 109, which is connected to ground and normally open. When arm 109 is closed by relay 108, the arm 109 connects positive terminal 110 to ground through line 111. Also, line 94 contains a relay 112 which controls contact arm 113, which is connected to ground and normally open. When arm 113 is closed by relay 112, the arm 113 connects positive terminal 114 to ground through line 115. The positive terminals 110 and 114 are connected to a servo control unit 116 which is adapted to actuate the ailerons 118 in one direction or the other, depending upon which of the terminals is sending the signal. When it is desired to maintain straight flight of the aircraft, a negative signal is applied to terminal 101 through pivoted switch arm 117. For a left turn, terminal 101 is disconnected and a negative signal is applied to terminal 100 through switch arm 117. For a right turn, a negative signal is applied to terminal 99 and terminal 101 is disconnected.

*Gyro pilot operation*

The operation of the gyro pilot will now be explained. Prior to flight, and while the aircraft is level, it is sometimes necessary to cage the gyro wheel so that the spin axis will be positioned for proper operation of the instrument. For this purpose, it is only necessary to apply a positive signal to terminal 107 while a negative signal is applied to terminal 101. The contact arm 104 will be open, and coil 55 will be energized so that precessor head 68 will contact dome 69 and precess the gyro into its proper position. The caging of the gyro can also be accomplished by giving either a right or left hand signal, in which case terminal 101 is de-energized and contact 104 is closed. Current will then be supplied through coil 55 from line 93, and the precessor head 68 will be moved to cage the gyro.

Figure 6:
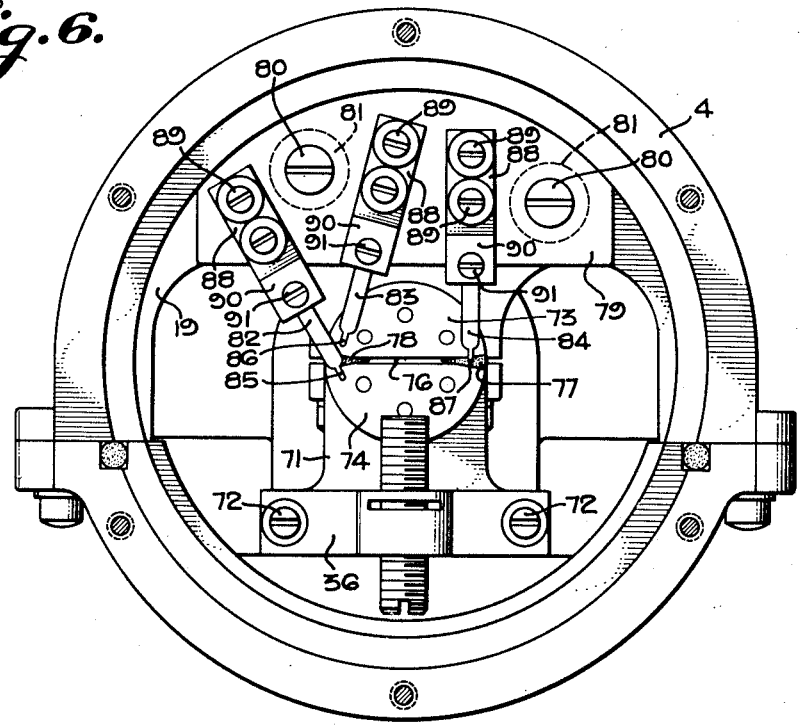
Fig. 6 is a sectional view of the gyro pilot housing along line 6—6 of Fig. 3, showing the pickoff assembly in end elevation.

As the aircraft takes off, only terminal 101 is receiving a signal, and contact 104 is open so that the precessor 57 is inactive. The contact point 87 is therefore energized, and as long as the aircraft is not turning to right or left, point 87 remains on insulated wedge 77 (see Fig. 6). However, if the aircraft starts to turn to the left, point 87 contacts disk section 73 and allows current to flow through line 95, so that relay 108 will close contact arm 109. Terminal 110 will therefore be energized and the aileron servo will be actuated to move the control surface to bring the aircraft back to normal straight flight. If, in returning to straight flight, the aircraft overshoots and banks to the right, contact point 87 will engage disk section 74, which will result in current flowing in line 94. Relay 112 will close contact arm 113 and terminal 114 will be energized and the aileron servo will be actuated to bring the aircraft back to straight flight. Since point 87 is directly connected to the aircraft, it will move relative to disk sections 73 and 74 which are held stationary in space by the gyro, since the precessor 57 is not in contact with the gyro dome. If the aircraft starts to turn to the right, point 87 will contact disk 74 and line 115 will energize terminal 114 to bring the aircraft back to straight flight. Therefore, contact point 87 provides a means of normally guiding an aircraft straight on its course.

Assume that when the gyro is caged prior to flight, the aircraft is tipped to one side or the other. The gyro would then assume a position to maintain the aircraft in the rolled position that it had at the time the gyro was caged. In other words, the gyro would not be in a position to maintain level flight. As the aircraft takes off, it would therefore start to turn, since the wings are not level and the gyro is tipped. However, the gyro will sense the turning or yawing of the aircraft which results from its rolled position, and point 87 will move off of insulated wedge 77. This will result in the servo moving the ailerons in such a way as to stop the turning of the airplane. This is one advantage of having a tilted gyro which is sensitive to both yaw and roll around the same axis, as has been previously described. The point 87 will continue to actuate the servo until the aircraft has leveled off and is flying a straight course. A straight course can only result if the minor axis of the gyro is horizontal, otherwise point 87 will try to roll the aircraft, during which time the aircraft will be turning. After the aircraft has turned enough to bring the minor axis of the gyro into horizontal position for level flight, the aircraft will have leveled off and the gyro will then correct any roll which would tend to make the aircraft turn. It is therefore apparent that the aircraft will level off in straight flight in a slightly different direction from which it is headed if the aircraft is tilted when taking off.

If, while the aircraft is flying straight, it is desired to turn the aircraft to the left at a constant rate, a negative signal will be applied to terminal 100. Terminal 101 thereby becomes neutral, causing contact arm 104 to close and coil 55 to move precessor head 68 against dome 69. Contact point 86 is in contact with disk section 73, which allows current to energize relay 108 to close contact arm 109. The side of the aileron servo connected to terminal 110 will then move the aileron in such a way as to cause a left turn. Once the control surface is moved from neutral position, the rate of turn will continuously increase until the surface is moved back to neutral position, at which time the rate of turn will tend to become constant. As the aileron is actuated for a left turn, the contact point 86 will approach insulated wedge 78 at an increasing rate, corresponding to the increasing rate of turn of the aircraft. At the same time, precessor head 68 will move away from the spin axis of the gyro and cause the gyro to precess at a constant rate in the same direction as the point 86 is moving. The contact point 86 will therefore catch up to the insulated wedge 78, which is turning at the same constant rate as the gyro. During the time contact point 86 is over insulated wedge 78, the servo will not actuate the ailerons, which will be allowed to streamline so that the rate of turn of the aircraft will remain constant at the desired value. Therefore, as long as the rate of turn of the aircraft remains the same as the precession rate of the gyro, the aileron servo will remain inactive, and allow the aileron to remain streamlined. If the rate of turn becomes too great, the contact point 86 will move into contact with disk section 74, which will result in the closing of contact arm 113, and also the actuation of the servo to roll the aircraft in a direction to decrease the rate of turn. When the rate of turn drops behind the pre-selected rate, contact point 86 will again contact disk section 73, and cause the aileron to move so as to bring the rate of turn back to the selected rate. Each time the ailerons are moved to correct the rate of turn, the roll imparted to the aircraft is in a direction to move the contact point 86 toward the insulated wedge 76.

When it is desired to turn the aircraft to the right at a constant rate, a negative signal on terminal 101 will be removed. The contact arm 104 will close and allow solenoid 55 to move precessor head 68 against dome 69 so that the gyro will be precessed at a constant rate, once the head 68 has moved away from the spin axis. The contact point 85 in contact with disk section 74 will start current flowing in relay 112 to close contact arm 113 and actuate the side of the servo connected to terminal 114. This will cause the aileron to move and start the aircraft turning to the right. The contact point 85 will approach the insulated wedge 78 at an increasing rate, as long as the aileron is actuated. At the same time, precessor head 68 will move to the right of the spin axis and start the precession of the gyro. After the contact point 85 reaches the insulated wedge 78, it will remain on the wedge as long as the rate of turn of the aircraft is the same as the rate of precession of the gyro. During this time, the ailerons of the aircraft will be streamlined. If the rate of turn becomes too fast, contact point 85 will contact disk section 73 and cause the ailerons to be moved to decrease the rate of turn. When the rate of turn is too slow, the point 85 will again contact disk section 74 and cause the ailerons to be moved to increase the rate of turn. If the gyro were not precessed, straight flight would result. However, by having the gyro precess at a constant rate, it can provide a reference point which will determine the desired rate of turn. While the gyroscope is being precessed by precessor head 68 to effect either a right or left turn, it is important that the gyroscopic rotor casing be maintained in substantially a constant position with respect to the gyro casing 1, since otherwise the essential tilt attitude of the spin axis would be lost. It will be seen that the gyroscopic spin axis is maintained in substantially constant relationship with casing 1 for the reason that should the spin axis become misaligned with the axis of precessor head 68, an erecting frictional force will be developed to precess the gyro directly back into the position where the spin axis and the precessor head are in alignment.

The aircraft can be leveled off at any time by removing the right or left turn signal and again applying a negative signal to terminal 101. At such a time, the aircraft will be rolled so that contact point 87 will be in contact with either disk section 74 or disk section 73, depending on whether the aircraft is executing a right or left turn. This is due to the fact that the aircraft has moved relative to the gyro by the distance between the wedge 78 and either of the contact points 85 or 86. Since the gyro will not be precessing after terminal 101 is given a negative signal, contact point 87 will immediately cause the aircraft to roll in a direction to level off and move contact point 87 toward wedge 77. At this time, the minor axis of the gyro will still be tipped from the horizontal, since the gyro has been precessed from its original position. However, the gyro will sense that the aircraft is still turning and will cause the aircraft to level off at such time as it has changed direction sufficiently to level off the minor axis of the gyro.

The gyro pilot, which has been described, is capable of controlling the direction of an aircraft during flight. It can be utilized to turn the aircraft at a constant rate in either direction or to keep the aircraft on a straight path. The novel precessing means and follow-up means, which comprise features of the gyro pilot, have been made simple and compact so that the weight of the gyro pilot is not excessive and positive operation of the invention is assured. Various modifications are contemplated and may obviously be resorted to by those skilled in the art without departing from the spirit and scope of the invention, as hereinafter defined by the appended claims.

What is claimed is:

1. In a gyro pilot for controlling the direction of flight of an aircraft, a gyro responsive to both roll and yaw of the aircraft, first means for precessing said gyro at a constant rate about its roll-yaw axis, second means attached to said gyro for movement therewith, third servo means for positioning said aircraft about its roll axis, means cooperating with said second means when said gyro is not being precessed to control said servo means and maintain the aircraft in straight flight, and fourth means cooperating with said second means during precession of said gyro by said first means to control said servo means and maintain the rate of turn of the aircraft constant in either direction.

2. In a gyro pilot for controlling the direction of flight of an aircraft, a gyro responsive to both roll and yaw of the aircraft, precessing means for precessing said gyro at a constant rate, means connected to said gyro and providing two separated sources of potential, a relay connected to each source of potential, said relays being operative one at a time to control the direction of turn of the aircraft, first, second and third contact points arranged to be selectively supplied with a negative signal, each of said contact points cooperating with said potential sources when receiving a negative signal, and thereby serving to energize one or the other of said relays to control the flight direction of the aircraft, said first contact point adapted to receive a signal while said precessing means is inactive to keep the aircraft straight, said second contact point adapted to receive a signal to precess the gyro and to maintain a constant rate of turn in one direction and said third contact point adapted to receive a signal to precess the gyro and to maintain a constant rate of turn in the other direction.

3. In a gyro pilot for controlling the direction of flight of an aircraft, a gyro responsive to both roll and yaw of the aircraft, a spherical dome attached to the rotor of said gyro, a precessor operative to contact said dome for precessing the gyro at a constant rate, a solenoid for controlling the position of said precessor, a control member attached to said gyro and movable therewith, a first circuit for de-energizing said solenoid so that said gyro is free in space, a member in said first circuit cooperating with said control member to maintain the aircraft in level flight, a second circuit for energizing said solenoid so as to precess the gyro, a member in said second circuit cooperating with said control member to cause said aircraft to turn in one direction at a constant rate, a third circuit for energizing said solenoid so as to precess the gyro, and a member in said third circuit cooperating with said control member to cause said aircraft to turn in the other direction at a constant rate.

4. In a gyro pilot for controlling the direction of flight of an aircraft, a gyro responsive to both roll and yaw of said aircraft, a precessor movable into contact with said gyro to precess said gyro at a constant rate, a control member attached to said gyro and comprising first and second disk sections separated from one another by an insulating member, a first circuit for supplying a potential to said first disk section and containing a first relay which operates to move the control surface of the aircraft in one direction, a second circuit for supplying a potential to said second disk section and containing a second relay which operates to move said control surface of the aircraft in the other direction, a third circuit containing a third relay which operates to move said precessor away from said gyro so that it will not precess said gyro, a first contact point in said third circuit normally engaging said insulating member when receiving a straight flight signal and movable to contact either said first or second disk section to energize either said first or second relay to correct for any roll of said aircraft away from straight flight.

5. In the gyro pilot of claim 4, said first contact point being movable to contact said first disk section and energize said first relay when the aircraft rolls to the right and movable to contact said second disk section and energize said second relay when the aircraft rolls to the left.

6. In the gyro pilot of claim 4, a second contact point normally contacting said first disk section during straight flight and responsive to a right turn signal to operate said first relay and cause the gyro to precess to the right, said contact point remaining on said insulating member when the rate of turn to the right is equal to the rate of precession of said gyro to the right and movable to contact either disk section to operate either the first or second relay to maintain the desired rate of turn of the aircraft, a third contact point normally contacting said second disk section during level flight and responsive to a left turn signal to operate said second relay and cause the gyro to precess to the left, said third contact point remaining on said insulating member when the rate of turn to the left is equal to the rate of precession of said gyro to the left and movable to contact either disk section to operate either the first or second relay to maintain the desired rate of turn.

7. In a gyro pilot for controlling the direction of flight of an aircraft, a gyro responsive to both roll and yaw of said aircraft, a precessor movable into contact with said gyro to precess said gyro at a constant rate, a control member attached to said gyro and comprising first and second disk sections separated from one another by an insulating member, a first circuit for supplying a potential to said first disk section and containing a first relay which operates to move the control surface of the aircraft in one direction, a second circuit for supplying a potential to said second disk section and containing a second relay which operates to move said control surface of the aircraft in the other direction, a first contact point normally contacting said first disk section during level flight and responsive to a right turn signal to operate said first relay and cause the gyro to precess to the right, said first contact point remaining on said insulating member when the rate of turn to the right is equal to the rate of precession of said gyro to the right and movable to contact either disk section to operate either the first or second relay to maintain the desired rate of turn of the aircraft, a second contact point normally contacting said second disk section during level flight and responsive to a left turn signal to operate said second relay and cause the gyro to precess to the left, said contact point remaining on said insulating member when the rate of turn to the left is equal to the rate of precession of said gyro to the left and movable to contact either disk section to operate either the first or second relay to maintain the desired rate of turn.

8. In a gyro pilot for controlling the direction of flight of an aircraft, a gyro responsive to roll and yaw of the aircraft, servo means for positioning said aircraft about its roll axis, first means attached to said gyro, second means attached to the aircraft and normally cooperating with the said first means to control said servo means and maintain said aircraft in straight flight, a single precessor for selectively precessing said gyro at a constant rate in either direction about the roll-yaw axis of said gyro, and third means attached to the aircraft and cooperating with said first means during precessional movement of said gyro by said precessor for controlling said servo means and maintaining a constant rate of turn of the aircraft in a direction corresponding to the direction of precession of the gyro, said second means being inoperative to maintain straight flight during operation of said precessor.

9. In a gyro pilot for controlling the direction of flight of an aircraft, a gyro responsive to the roll and yaw of the aircraft, servo means for positioning said aircraft about its roll axis, means for precessing said gyro at a constant rate about the roll-yaw axis of said gyro, a contact disk comprising two sections separated from one another by insulating means and attached to the roll gimbal of said gyro, said disk sections being constantly connected to a potential source, a first pickoff movable with the aircraft and cooperating with said insulating means to control said servo means and maintain straight flight when said precessing means is inoperative and a second pickoff movable with said aircraft and cooperating with said insulating means while said precessing means is operative to control said servo means and cause said aircraft to turn at a rate corresponding to the rate of precession of said gyro.

10. In a gyro pilot for controlling the direction of flight of an aircraft, a gyro universally supported by the aircraft and having its spin axis inclined fore and aft in order for the gyro to be responsive to both roll and yaw of the aircraft, a single precessor for precessing said gyro at a constant rate in either direction about its roll-yaw axis, control means attached to said gyro and movable therewith, means selective to activate said precessor to precess said gyro in one direction about its roll-yaw axis, means operative upon actuation of said last mentioned means to cooperate with said control means to cause said aircraft to move in said one direction at a constant rate equal to the precession rate of said gyro, means selective to actuate said precessor to precess said gyro in the opposite direction about its roll-yaw axis and means operative upon actuation of said last mentioned means to cooperate with said control means to cause said aircraft to move in said opposite direction at a constant rate equal to the precession rate of said gyro.

11. In a gyro pilot for controlling the direction of flight of an aircraft, a gyroscope having a gyro rotor mounted for universal movement and a spin axis, a pickoff means having one portion attached to said gyroscope and another portion attached to said aircraft, said pickoff means having a straight flight null position and a turn null position spaced therefrom by a slight amount, a spherical surface mounted to rotate with said gyro rotor and a single precessor mounted by said aircraft in position to cooperate with said surface and thereby precess said rotor, said precessor being inoperative and positioned in line with said spin axis during straight flight of said aircraft, and means for causing said precessor to cooperate with said surface and for simultaneously changing the null position of said pickoff from its straight flight position to its turn position, said precessor thereafter assuming a position slightly displaced from said spin axis as determined by the distance between said null positions to continually precess said gyro rotor at a constant rate.

12. In a gyro pilot for controlling the direction of flight of an aircraft, a gyroscope mounted for universal movement and having a spin axis, a single precessor mounted by said aircraft for applying a force to said gyroscope to cause said spin axis to move toward said precessor, a pickoff means including one portion attached to said gyroscope and another portion attached to said aircraft, said pickoff means having a straight flight null position and a turn null position spaced slightly therefrom, said precessor being inoperative to precess said gyro during straight flight when said straight flight null position is controlling and means for causing said turn null position to become controlling and simultaneously causing said precessor to apply a force to said gyroscope at a position displaced from spin axis by a slight amount determined by the distance between said null positions.

13. A gyroscopic controller comprising, a gyroscope having a gyro rotor mounted for free universal movement relative to a stationary support, a spherical surface operatively connected with said gyroscope, a single contact element operatively connected with said stationary support for selective engagement with said spherical surface, a pickoff means including one portion attached to said gyroscope and another portion attached to said support, means for changing the null position of said pickoff by a small increment when it is desired to turn said aircraft, and means for causing said element to engage said spherical surface upon change in the null position so that said precessor will be displaced from said spin axis by an amount corresponding to the increment change in the null position and thereafter continually precess said gyroscope at a constant rate.

14. In a gyro pilot for controlling the direction of flight of an aircraft, a gyroscope means mounted for universal movement, pickoff means having one portion attached to said gyroscope means and another portion attached to said aircraft, means responsive to said pickoff means for controlling the direction of flight of said aircraft, means for turning said aircraft by changing the null position of said pickoff and means responsive to the actuation of said turning means for precessing said gyroscope at a constant rate in order to maintain the rate of turn constant.

References Cited in the file of this patent

UNITED STATES PATENTS

| Number | Name | Date |
| --- | --- | --- |
| 2,190,390 | Thiry | Feb. 13, 1940 |
| 2,280,116 | Carlson | Apr. 21, 1942 |
| 2,446,180 | Haskins | Aug. 3, 1948 |
| 2,493,015 | Newton | Jan. 3, 1950 |
| 2,513,120 | Turner | June 27, 1950 |
| 2,559,298 | Hayes | July 3, 1951 |